United States Patent
Kabakov et al.

(10) Patent No.: US 11,767,130 B2
(45) Date of Patent: Sep. 26, 2023

(54) SYSTEM AND METHOD FOR LAUNCHING AND RETRIEVING UNMANNED AERIAL VEHICLE FROM CARRIER IN MOTION

(71) Applicant: Honeywell International Inc., Charlotte, NC (US)

(72) Inventors: Nikola Kabakov, Brno (CZ); Lukas Harvanek, Brno (CZ); Michal Zavisek, Brno (CZ)

(73) Assignee: Honeywell International Inc., Charlotte, NC (US)

( * ) Notice: Subject to any disclaimer, the term of this patent is extended or adjusted under 35 U.S.C. 154(b) by 147 days.

(21) Appl. No.: 17/373,014

(22) Filed: Jul. 12, 2021

(65) Prior Publication Data

US 2023/0008634 A1   Jan. 12, 2023

(51) Int. Cl.
| B64F 1/00 | (2006.01) |
| B64C 39/02 | (2023.01) |
| B64U 10/13 | (2023.01) |
| B64U 70/30 | (2023.01) |
| B64U 80/86 | (2023.01) |

(52) U.S. Cl.
CPC ............ B64F 1/007 (2013.01); B64C 39/024 (2013.01); B64U 10/13 (2023.01); B64U 70/30 (2023.01); B64U 80/86 (2023.01); B64U 2201/10 (2023.01)

(58) Field of Classification Search
CPC ......... B64F 1/007; B64U 70/30; B64U 80/82; B64U 80/84; B64U 80/86
See application file for complete search history.

(56) References Cited

U.S. PATENT DOCUMENTS

| 8,172,177 B2 | 5/2012 | Lovell et al. |
| 9,302,783 B2 | 4/2016 | Wang |
| 9,481,475 B2 | 11/2016 | Campillo et al. |
| 9,981,745 B2 | 5/2018 | Gil |
| 10,207,820 B2 | 2/2019 | Sullivan |
| 2006/0249622 A1* | 11/2006 | Steele ............... B64F 1/02 244/115 |

(Continued)

FOREIGN PATENT DOCUMENTS

| CN | 108202875 A | 6/2018 |
| EP | 2766260 A1 | 8/2014 |

(Continued)

OTHER PUBLICATIONS

"Autonomous Landing on a Moving Vehicle with an Unmanned Aerial Vehicle", Tomas Baca et al., 32 pages, Jan. 4, 2019.

(Continued)

*Primary Examiner* — Richard G Davis
(74) *Attorney, Agent, or Firm* — Bookoff McAndrews, PLLC

(57) ABSTRACT

A system for deploying and retrieving an unmanned aerial vehicle (UAV) with a UAV carrier including a UAV bay, where the system includes a UAV pad including a UAV pad base and a UAV pad coupler to couple the UAV to the UAV pad base; a mechanical arm including a first end configured to couple to the UAV carrier, and a second end configured to couple to the UAV pad; and a controller configured to determine a deployment position for the UAV pad, determine a retrieval position for the UAV pad, control the UAV pad, and control the mechanical arm.

18 Claims, 10 Drawing Sheets

(56) References Cited

U.S. PATENT DOCUMENTS

| | | | |
|---|---|---|---|
| 2015/0266575 A1* | 9/2015 | Borko | B64F 1/222 |
| | | | 244/17.23 |
| 2018/0165973 A1 | 6/2018 | Chun | |
| 2019/0072983 A1 | 3/2019 | Zhang | |
| 2019/0126478 A1 | 5/2019 | Scott et al. | |
| 2019/0225337 A1* | 7/2019 | Vorwerk | B64C 39/024 |
| 2020/0290753 A1 | 9/2020 | Anastassacos et al. | |
| 2021/0109546 A1* | 4/2021 | Christiana | G05D 1/101 |
| 2022/0035381 A1* | 2/2022 | Okuno | G05D 1/0858 |
| 2022/0340298 A1* | 10/2022 | Parsons | B64F 1/10 |

FOREIGN PATENT DOCUMENTS

| | | | |
|---|---|---|---|
| WO | 2013055265 A1 | 4/2013 | |
| WO | 2016137982 A1 | 9/2016 | |

OTHER PUBLICATIONS

"Vision-based UAV landing on the moving vehicle", Hanseob Lee et al., 8 pages, 2016 International Conference on Unmanned Aircraft Systems (ICUAS), Jun. 7-10, 2016.

\* cited by examiner

SYSTEM AND METHOD FOR LAUNCHING AND RETRIEVING UNMANNED AERIAL VEHICLE FROM CARRIER IN MOTION

TECHNICAL FIELD

Various embodiments of the present disclosure relate generally to systems and methods for launching and retrieving an Unmanned Aerial Vehicle (UAV) from a UAV carrier in motion.

BACKGROUND

An Unmanned Aerial Vehicle (UAV) can be used for performing various missions in military and civil operations, such as collecting information, transporting cargo, or using UAV equipment in remote locations. Conventional methods to launch and land a UAV are performed from or onto a stationary position such as the ground, a catapult, a stationary vehicle, or a UAV nest, which requires additional overhead time for launching, retrieving, or transportation of the UAV to or from the mission location.

The present disclosure is directed to overcoming one or more of these above-referenced challenges.

SUMMARY OF THE DISCLOSURE

According to certain aspects of the disclosure, a system for deploying and retrieving an unmanned aerial vehicle (UAV) with a UAV carrier including a UAV bay, includes: a UAV pad including a UAV pad base and a UAV pad coupler to couple the UAV to the UAV pad base; a mechanical arm including a first end configured to couple to the UAV carrier, and a second end configured to couple to the UAV pad; and a controller configured to determine a deployment position for the UAV pad so that an orientation of the UAV pad in the deployment position is based on an orientation of the UAV in a deployment flight path of the UAV from the UAV carrier, determine a retrieval position for the UAV pad so that an orientation of the UAV pad in the retrieval position is based on an orientation of the UAV in a retrieval flight path of the UAV, control the UAV pad, and control the mechanical arm to receive the UAV pad from the UAV bay in the UAV carrier so that the UAV pad is coupled to the second end of the mechanical arm, move the UAV pad to a standby position on the UAV carrier, orient the UAV pad to the deployment position for the deployment flight path of the UAV from the UAV carrier, and orient the UAV pad to the retrieval position for the retrieval flight path of the UAV.

According to certain aspects of the disclosure, a method for deploying and retrieving an unmanned aerial vehicle (UAV) with a UAV carrier including a UAV bay, a UAV pad including a UAV pad base and a UAV pad coupler to couple the UAV to the UAV pad base, a mechanical arm to move the UAV pad, and including a first end configured to couple to the UAV carrier, and a second end configured to couple to the UAV pad, and a controller, comprises performing, by the controller, operations including: determining a deployment position for the UAV pad so that an orientation of the UAV pad in the deployment position is based on an orientation of the UAV in a deployment flight path of the UAV from the UAV carrier, determining a retrieval position for the UAV pad so that an orientation of the UAV pad in the retrieval position is based on an orientation of the UAV in a retrieval flight path of the UAV, controlling the UAV pad, and controlling the mechanical arm to receive the UAV pad from the UAV bay in the UAV carrier so that the UAV pad is coupled to the second end of the mechanical arm, move the UAV pad to a standby position on the UAV carrier, orient the UAV pad to the deployment position for the deployment flight path of the UAV from the UAV carrier, and orient the UAV pad to the retrieval position for the retrieval flight path of the UAV.

According to certain aspects of the disclosure, a non-transitory computer-readable medium stores instructions, that when executed by at least one processor, perform a method for deploying and retrieving an unmanned aerial vehicle (UAV) with a UAV carrier including a UAV bay, a UAV pad including a UAV pad base and a UAV pad coupler to couple the UAV to the UAV pad base, a mechanical arm to move the UAV pad, and including a first end configured to couple to the UAV carrier, and a second end configured to couple to the UAV pad, the method comprising: determining a deployment position for the UAV pad so that an orientation of the UAV pad in the deployment position is based on an orientation of the UAV in a deployment flight path of the UAV from the UAV carrier, determining a retrieval position for the UAV pad so that an orientation of the UAV pad in the retrieval position is based on an orientation of the UAV in a retrieval flight path of the UAV, controlling the UAV pad, and controlling the mechanical arm to receive the UAV pad from the UAV bay in the UAV carrier so that the UAV pad is coupled to the second end of the mechanical arm, move the UAV pad to a standby position on the UAV carrier, orient the UAV pad to the deployment position for the deployment flight path of the UAV from the UAV carrier, and orient the UAV pad to the retrieval position for the retrieval flight path of the UAV.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods may be significantly reduced overhead time required for launching and retrieving a UAV from a UAV carrier. The disclosed systems and methods discussed below may significantly reduce the time required for launching and retrieving a UAV from a UAV carrier by deploying the UAV for performing a mission and retrieving the UAV afterwards while the UAV carrier is in motion without a need to stop the UAV carrier, which increases an operational potential of the UAV carrier and decreases potential risks when the UAV carrier is operating in areas with security risks.

The system, devices, and methods of the embodiments discussed below may provide an improvement upon conventional technology by providing a flexible and effective use of a UAV from a moving UAV carrier for performing standard missions such as surveillance tasks, carrying small loads, or using UAV equipment in a remote location. This eliminates a need to stop for deploying or retrieving a UAV, which might cause of loss of time which could jeopardize the mission or expose the UAV carrier and crew to danger if the UAV carrier is performing a mission in an area with security risks. The embodiments may also provide a capability to use a UAV in a new type of mission which is not conventionally possible or reasonable due to limited operational time of a UAV and due to a use of conventional stationary methods for UAV deployment and retrieval.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
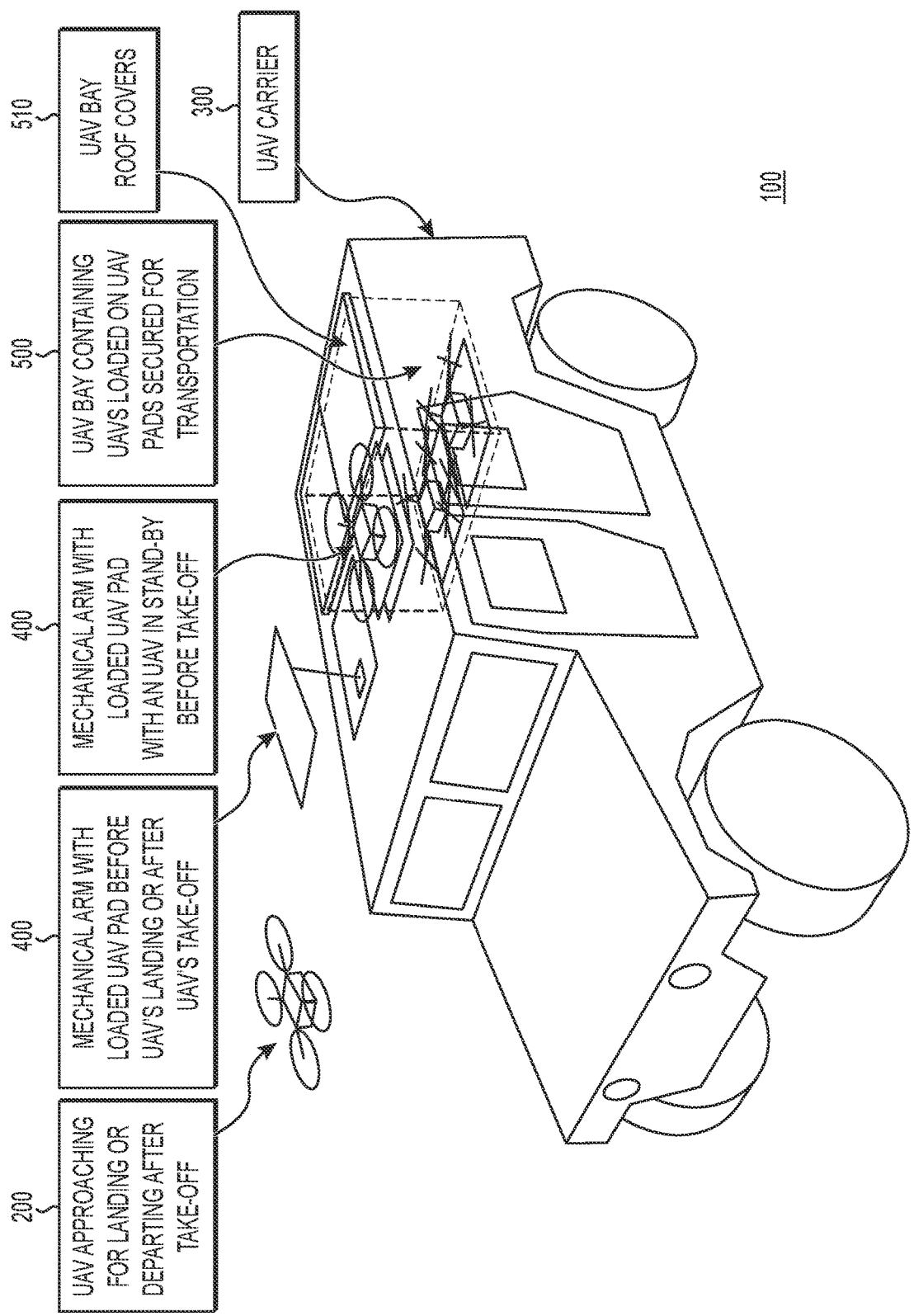
FIG. 1 depicts an exemplary UAV launch and retrieval system implemented in a surface off-road UAV carrier, according to one or more embodiments.

Various embodiments of the present disclosure relate generally to systems and methods for launching and retrieving an Unmanned Aerial Vehicle (UAV) from a UAV carrier in motion.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Any suitable system infrastructure may be put into place to implement the embodiments discussed below. The accompanying drawings and the following discussion provide a brief, general description of a suitable environment in which the present disclosure may be implemented. In one embodiment, any of the disclosed systems, methods, and/or graphical user interfaces may be executed by or implemented by a computing system consistent with or similar to that depicted in FIG. 2. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

FIG. 1 depicts an exemplary UAV launch and retrieval system 100 implemented in a UAV carrier 300, such as a surface off-road vehicle, for example, according to one or more embodiments.

As shown in FIG. 1, a UAV launch and retrieval system 100 may be implemented as part of or in addition to a UAV carrier 300. The UAV launch and retrieval system 100 may include a UAV carrier 300, a UAV 200, a mechanical arm 400 (illustrated in FIG. 1 with both an empty UAV pad 600 and a UAV pad 600 loaded with a UAV 200) to position a UAV pad 600, a UAV bay 500, and a UAV bay cover 510, for example.

The UAV carrier 300 may be modified from a conventional carrier to interact with or within the UAV launch and retrieval system 100. The UAV carrier 300 may be a ground vehicle such as car, truck, bus, off-road vehicle, or military armored vehicle, may be a watercraft such as a ship, boat hovercraft, or submarine, or may be an aircraft or spacecraft. The UAV carrier 300 may have a capability to transport, launch, and retrieve a UAV 200 while the UAV carrier 300 is in motion.

The UAV 200 may be modified from a conventional UAV to interact with or within the UAV launch and retrieval system 100. The UAV 200 may be a multi-rotor vehicle, a fixed wing vehicle, a single rotor vehicle, or a fixed wing hybrid vertical take-off and landing vehicle, for example.

The UAV pad 600 may include a portable platform allowing automated coupling and decoupling with a UAV 200 while the UAV carrier 300 is in motion or is stationary, may secure transporting and storing of a UAV 200 in the UAV bay 500 of the UAV carrier 300, may provide transportation of a pre-launched UAV 200 from the UAV bay 500 to a deployment position for UAV take-off from the UAV carrier 300, and may provide transportation of the UAV 200 to the UAV bay 500. The UAV pad 600 may allow automated performance of additional UAV operations before and after the flight, such as initializing, turning-off, and testing of UAV equipment before the UAV flight or during storage in the UAV bay 500, or expanding and contracting expandable parts of the UAV 200 if the UAV 200 has different configurations for flight and transportation. Because the UAV carrier 300 may carry multiple versions of UAVs having different sizes, a UAV pad coupler 610 for automated coupling of the UAV 200 with the UAV pad 600 may be customized for a specific version and/or size of the UAV 200, while a wheeled base of the UAV pad 600 may have a common construction for all UAV pads to be used with a single version of the mechanical arm 400.

The mechanical, or articulated, arm 400 may allow positioning of the UAV pad 600 for take-off and landing of the UAV 200 and for transporting the UAV pad 600 to and from the UAV bay 500 of the UAV carrier 300. In addition, the mechanical arm 400 may compensate for the effect of changes in the UAV carrier 300 position and orientation relative to the desired UAV pad position and orientation, such as forward and lateral rotation or other movement of the UAV carrier 300 due to acceleration, turning, or de-acceleration of the UAV carrier 300, or changes caused by the disturbances in the surrounding environment, such as road surface irregularities, waves, and cross winds, for example.

The UAV bay 500 may be a compartment of the UAV carrier 300 designated for storing, transportations, refueling (including recharging and/or battery exchange), equipping, and maintenance of the UAV 200. A UAV 200 in the UAV bay 500 may be loaded on a UAV pad 600 and prepared for deployment in case of need. The UAV bay 500 may include a UAV bay cover 510 to open or close an opening of the UAV carrier 300 used to access the UAV bay 500 depending on a usage of the UAV bay 500.

Figure 2:
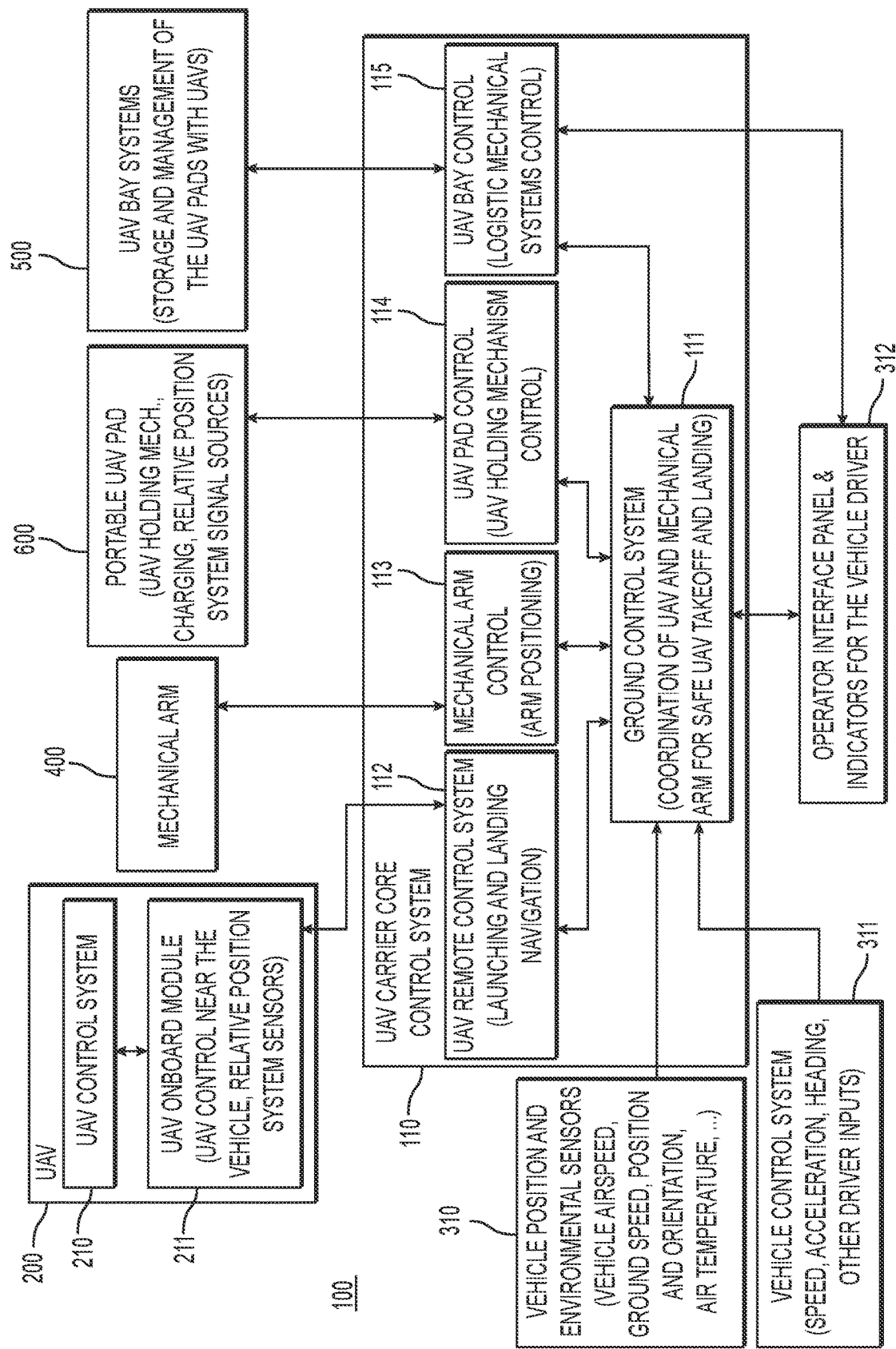
FIG. 2 depicts an exemplary system infrastructure for a UAV launch and retrieval system implemented in a UAV carrier, according to one or more embodiments.

FIG. 2 depicts an exemplary system infrastructure for a UAV launch and retrieval system 100 implemented in a UAV carrier 300, according to one or more embodiments.

As shown in FIG. 2, a UAV launch and retrieval system 100 may include a UAV 200, a mechanical arm 400, a portable UAV pad 600, a UAV bay 500, UAV carrier position and environmental sensors 310, a UAV carrier control system 311, a user interface 312, and a UAV carrier UAV control system 110. The UAV 200 may include an autonomous control system 210 and a UAV onboard module 211. The UAV carrier UAV control system 110 may include a UAV remote control system 112, a mechanical arm control system 113, a UAV pad control system 114, a UAV bay control system 115, and a ground control system 111.

Each of the various components of the UAV launch and retrieval system 100 may be discussed in further detail below.

The UAV onboard module 211 may provide UAV control near the UAV carrier 300, and provide relative position sensors. The UAV onboard module 211 may be a module added to the UAV 200 as a modification for determining the UAV position and orientation relative to the UAV pad 600 by using UAV relative position system sensors, for automated remote control of the UAV 200 during UAV take-off and landing maneuvers, and for UAV control while the UAV 200 is coupled with the UAV pad 600. The UAV onboard module 211 may communicate remotely with the UAV remote control system 112 of the UAV carrier 300 to receive commands for performing various phases of the UAV take-off and landing operations and other operations performed while the UAV 200 is coupled with the UAV pad 600, and to send information to the UAV remote control system 112 regarding the state, position, and orientation of the UAV 200. The UAV onboard module 211 may have the capability to take control over the UAV 200 while performing automated take-off and landing operations, and hand over control of the UAV 200 to the UAV remote control system 112 or autonomous control system 210 of the UAV 200 when the automated take-off operation is completed. The UAV onboard module 211 may also hand over control of the UAV 200 to the UAV remote control system 112 or autonomous control system 210 of the UAV 200 in a case that automated operations are aborted due to a situation preventing completion of automated operations, such as a driver turning the UAV carrier 300 too sharply or losing control of the UAV carrier 300 in a drift maneuver such that computing a prediction of the UAV carrier 300 trajectory is difficult, or due to a critical fault occurring.

The portable UAV pad 600 may provide a UAV pad coupler 610, charging capability for the UAV 200, and a relative position system. The relative positioning system may be a distributed system for real-time measurement of the UAV position and orientation relative to the UAV pad 600 during the automatic approach and departure maneuvers of the UAV 200. The relative positioning system of the UAV pad 600 may include electromagnetic radiation sources located on the UAV pad 600, UAV sensors for detecting and measuring the physical properties of emitted radiation from the sources and processing unit located in the UAV 200 as part of the UAV onboard module 211 for computing the UAV position and orientation relative to the UAV pad 600. The relative positioning system radiation sources may emit electromagnetic radiation such as radio waves, infrared light, visible light, and/or ultraviolet light, for example.

The UAV bay 500 may provide storage and management of a UAV pad 600 and UAV 200.

The UAV carrier position and environmental sensors 310 may provide information such as UAV carrier air speed, ground speed, position, orientation, and/or air temperature, for example. The UAV carrier control system 311 may control speed, acceleration, heading, and other functions of the UAV carrier 300.

The UAV carrier UAV control system 110 may be the main control system for automated UAV take-off and landing operations which include several subsystems.

The UAV remote control system 112 may provide launch and retrieval navigation. The mechanical arm control system 113 may control a position of the mechanical arm 400. The UAV pad control system 114 may control an operation of the UAV pad 600 and UAV pad coupler. The UAV bay control system 115 may control an operation of the UAV bay 500. The ground control system 111 may coordinate these and other systems for successful UAV launch and retrieval.

The UAV remote control system 112 may be a subsystem of the UAV carrier UAV control system 110, and may be responsible for performing automated operations of the UAV take-off and landing based on: (1) forward, lateral, and vertical velocity, and position and orientation of the UAV carrier 300 relative to the surface, (2) forward, lateral, and vertical velocity, and position and orientation of the UAV 200 relative to the surface, and (3) forward, lateral, and vertical velocity of the surrounding air relative to the UAV carrier 300. The UAV remote control system 112 may use advanced optimal control algorithms for a system with multiple inputs and multiple outputs, such as Model Predictive Control algorithms, for example.

The ground control system 111 may be a subsystem of the UAV carrier UAV control system 110, and may be responsible for coordination of the UAV 200, the mechanical arm 400, the UAV pad 600, and other UAV carrier systems in order to perform automated UAV take-off, landing, and UAV pad 600 operations. For coordination of the UAV pad position and orientation, the mechanical arm 400 operation, and the UAV position and orientation, the ground control system 111 may use advanced optimal control algorithms for a system with multiple inputs and multiple outputs. The ground control system 111 may be responsible for determining optimal approach and departure trajectories for the UAV 200, optimal position and orientation of the UAV pad 600, and corresponding positions of actuators of the mechanical arm 400, based on information from UAV carrier position and environmental sensors 310 for determining the UAV carrier 300 ground speed, air speed, position, and orientation, and based on information from the UAV carrier control system 311 about driver inputs for the UAV carrier 300 control, such as heading, acceleration, or braking, for example. The ground control system 111 may also receive commands for launching and landing of the UAV 200 or aborting of operations from an operator through user interface 312, for example, and might provide guidance to a driver of the UAV carrier 300 through user interface 312 about limits for inputs for acceleration, braking, and changes of in direction during the automated operations of the UAV 200 for take-off and landing. Operators, users, and drivers may be human or may be an automated or autonomous control system.

Figure 3:
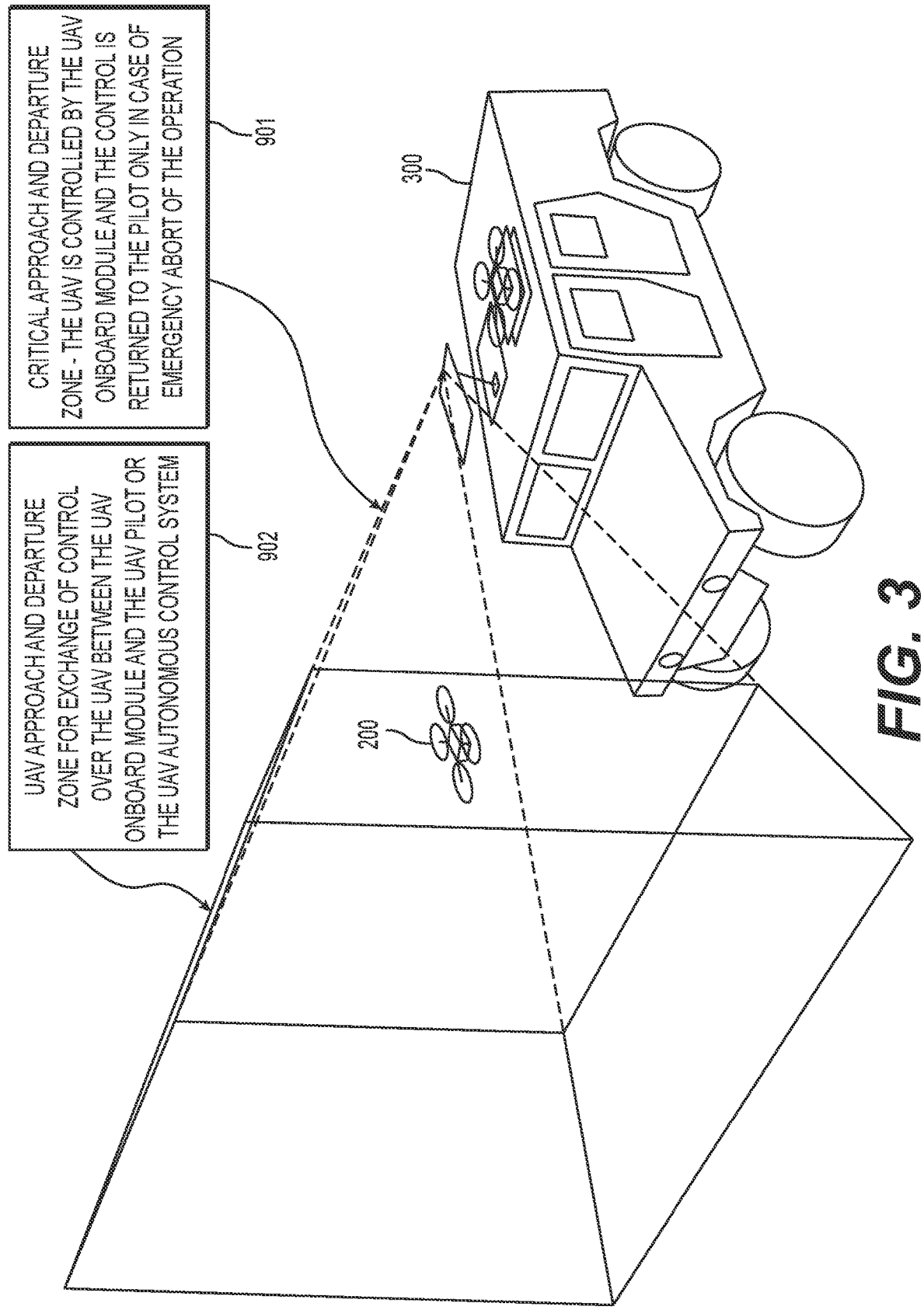
FIG. 3 depicts zones of control over a UAV during UAV take-off and landing near the UAV carrier, according to one or more embodiments.

FIG. 3 depicts a zone of control area 901 over a UAV 200 during the UAV take-off and landing near the UAV carrier 300, according to one or more embodiments.

As shown in FIG. 3, the UAV 200 may operate with more autonomous control in a control area 902 farther from the UAV carrier 300, and may operate in more coordinated control with the UAV carrier 300 in a zone of control area 901 closer to the UAV carrier 300. More specifically, control area 901 may be a critical approach and departure zone, where the UAV 200 may be controlled by the UAV onboard module 211 and control is returned to the pilot only in case of an emergency abort of an approach or departure operation. Control area 902 may be a non-critical approach and departure zone, where control of the UAV 200 may be exchanged between the UAV onboard module 211, a pilot of the UAV 200, or autonomous control system 210 of the UAV 200.

Figure 4:
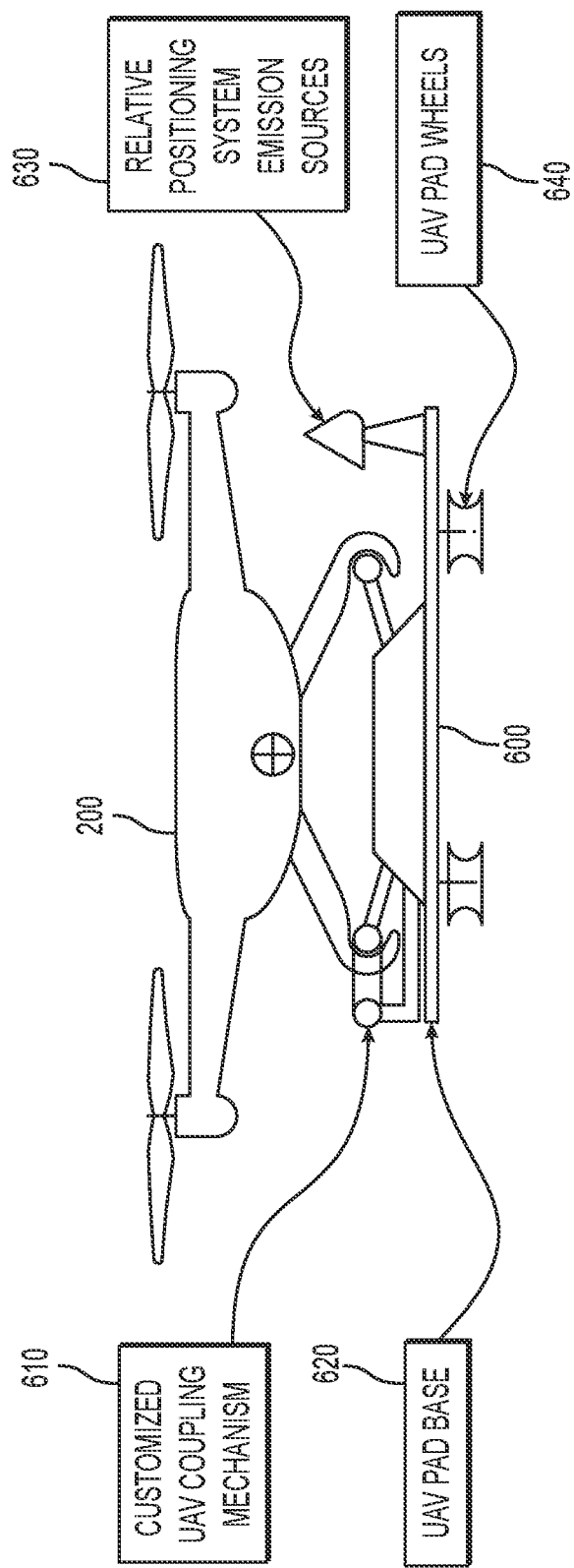
FIG. 4 depicts a UAV pad loaded with a UAV, according to one or more embodiments.

FIG. 4 depicts a UAV pad 600 loaded with a UAV 200, according to one or more embodiments.

As shown in FIG. 4, a UAV pad 600 may include a UAV pad base 620, at least one UAV pad wheel 640 provided on the UAV pad base 620 to move the UAV pad 600 on the UAV carrier 300 (such as along a set of rails 410, for example), a UAV pad coupler 610 provided on the UAV pad base 620 to secure and release, or decouple, the UAV 200 from the UAV pad 600, and at least one relative position sensor 630 to monitor a position of the UAV 200 relative to the UAV pad 600. The UAV pad base 620 may also be provided without at least one UAV pad wheel 640, and may be transported using other structures, or may be fixed to the mechanical arm 400.

Figure 5:
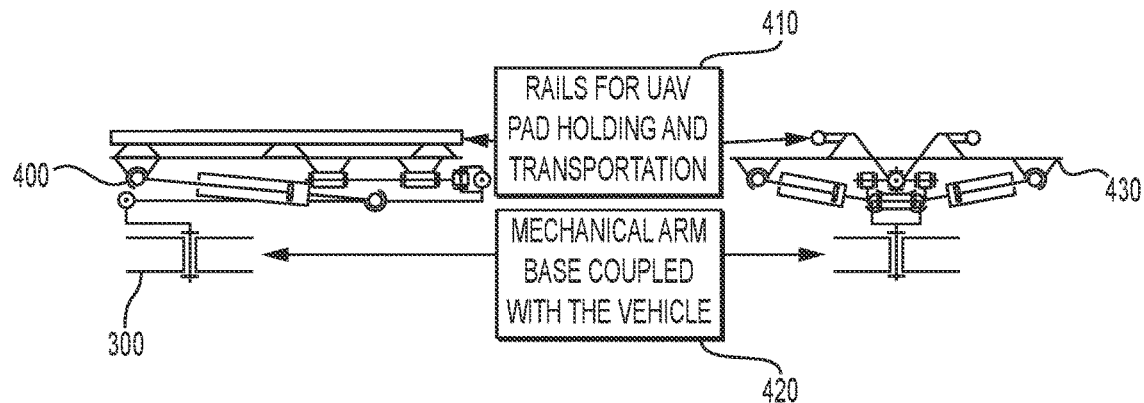
FIG. 5 depicts a mechanical arm in an initial contracted configuration, according to one or more embodiments.

FIG. 5 depicts two views of a mechanical arm 400 in a contracted configuration, according to one or more embodiments.

As shown in FIG. 5, the mechanical arm 400 may have a first end 420 coupled to the UAV carrier 300, and may have a second end 430 configured to couple with the UAV pad 600. For example, the second end 430 may include a set of rails 410 configured to couple with the UAV pad 600 via the at least one UAV pad wheel 640.

Figure 6:
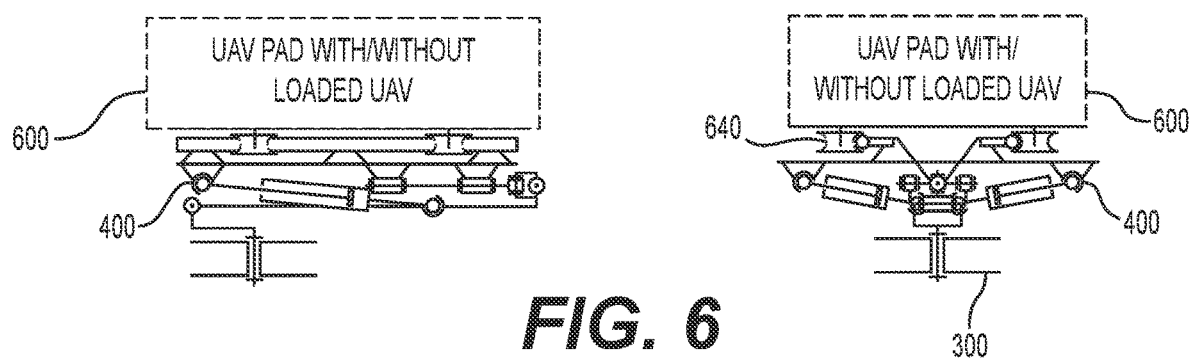
FIG. 6 depicts a mechanical arm with a UAV pad in an initial contracted configuration, according to one or more embodiments.

FIG. 6 depicts two views of a mechanical arm 400 with a UAV pad 600 in an initial contracted configuration, according to one or more embodiments.

Figure 7:
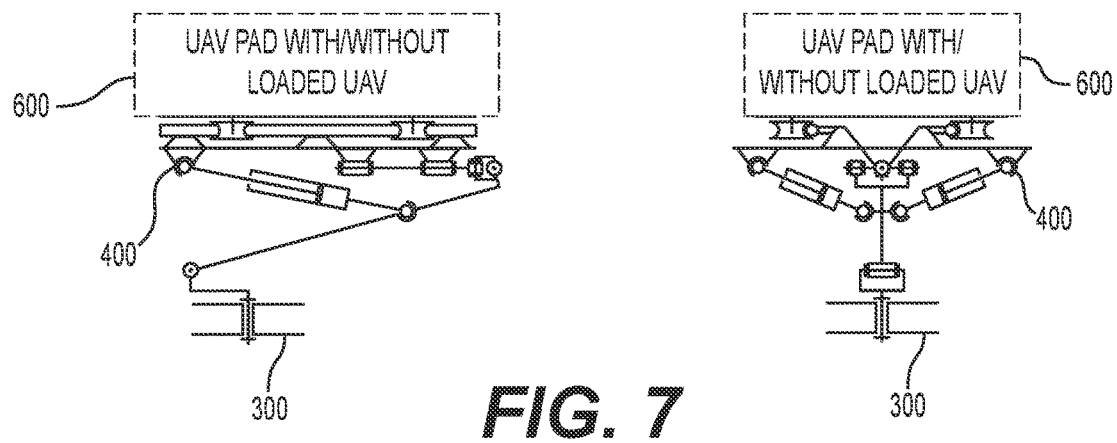
FIG. 7 depicts a mechanical arm with a UAV pad in configuration for vertical UAV take-off and landing when a UAV carrier is in horizontal stationary position without wind, according to one or more embodiments.

FIG. 7 depicts two views of a mechanical arm 400 with a UAV pad 600 in configuration for vertical UAV take-off and landing when a UAV carrier 300 is in horizontal stationary position without wind, according to one or more embodiments.

Figure 8:
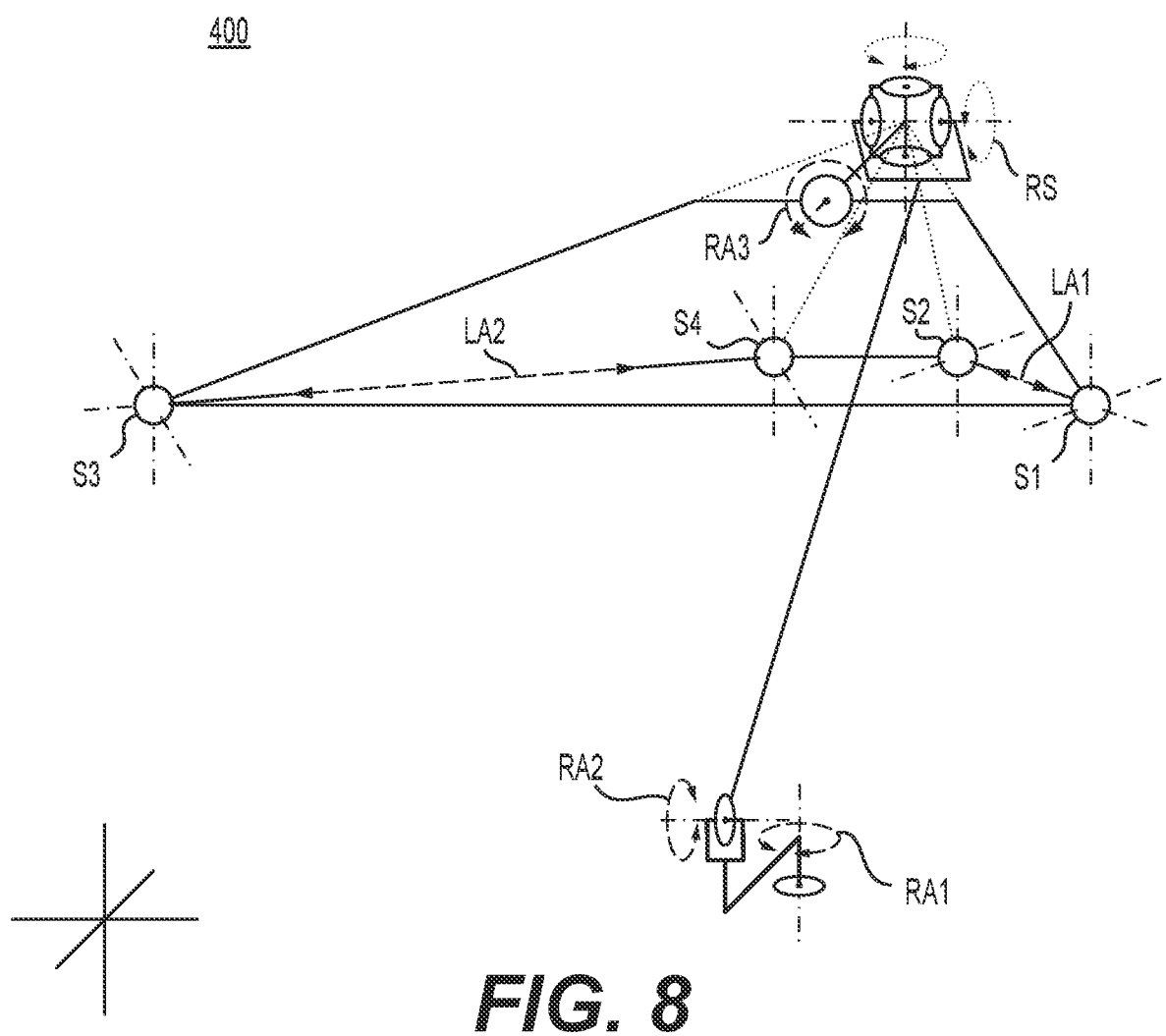
FIG. 8 depicts a kinematic model of the mechanical arm, according to one or more embodiments.

FIG. 8 depicts a kinematic model of the mechanical arm 400, according to one or more embodiments.

The mechanical arm 400 may be a mechatronic system with five degrees-of-freedom, and include three rotary actuators RA1, RA2, and RA3, two linear actuators LA1 and LA2, a system of revolute joints (or spherical joints) RS with two degrees-of-freedom, two spherical joints S1 and S3 with 3 degrees-of-freedom, two spherical joints S2 and S4 with two degrees-of-freedom, a link connecting RA1 and RA2, a link connecting RA2, S2, S4, and RS, a link connecting RS and RA3, a link connecting S1 and S2 with a variable length controlled by LA2, a link connecting S3 and S4 with a variable length controlled by LA2, and a planar system of links (positional plane) connecting S1, S3, and RA3. The rails for holding and transporting the UAV 200 may be connected to the planar system of links S1, S3, and RA3.

The operation of the mechanical arm 400 may be controlled by the mechanical arm control system 113. The mechanical arm control system 113 may control a position of the mechanical arm actuators RA1, RA2, RA3, LA1, and LA2 in order to change the configuration of the mechanical arm 400 to provide an optimal position of the UAV pad 600 for landing of the UAV 200 and coupling of the UAV 200 with the UAV pad 600, to provide an optimal position for decoupling of the UAV 200 from the UAV pad 600 for subsequent take-off and departure of the UAV 200 from the UAV pad 600, and to provide an optimal position for transporting the UAV pad 600 with or without a coupled UAV 200 into or out of the UAV bay 500 of the UAV carrier 300.

Figure 9:
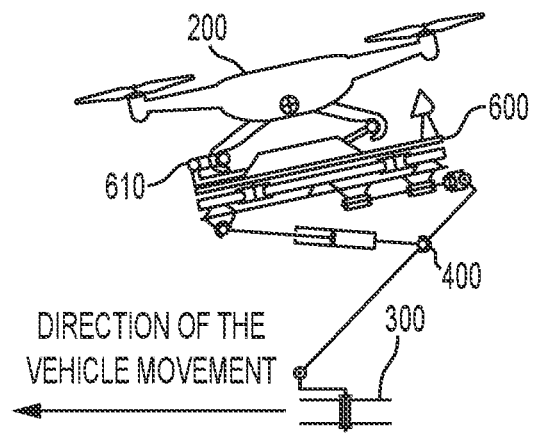
FIG. 9 depicts a configuration of the mechanical arm with a UAV pad and UAV before the UAV take-off, according to one or more embodiments.

FIG. 9 depicts a configuration of the mechanical arm 400 with a UAV pad 600 and UAV 200 before the UAV take-off, according to one or more embodiments.

As shown in FIG. 9, the mechanical arm 400 is configured to move a UAV pad 600 loaded with a UAV 200 secured with UAV pad coupler 610 into a position for UAV take-off. The mechanical arm 400 moves the UAV pad 600 loaded with the secured UAV 200 into a position and orientation relative to a surrounding environment that is equal to the UAV position and orientation during a flight of the UAV 200 with a same trajectory and velocity as a trajectory and velocity of the UAV pad 600 loaded with the secured UAV 200. The UAV propulsion (a set of UAV elements creating lift and thrust of the UAV 200) is initialized to correspond to a flight with the same trajectory and velocity as the UAV 200 while coupled to the UAV pad 600, and to establish a flight of the UAV 200 with a stable increase in a distance between the UAV 200 and UAV pad 600 positions, such as in forward and upper directions, for example. In other words, initial thrust and lift created by the UAV propulsion before take-off are such that the UAV 200 will not fall down or back to the UAV pad 600 when the UAV 200 is released for flight.

Figure 10:
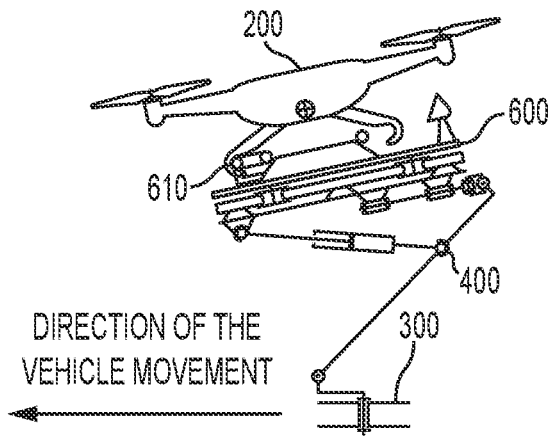
FIG. 10 depicts a configuration of the mechanical arm with a UAV pad and UAV during the UAV take-off, according to one or more embodiments.

FIG. 10 depicts a configuration of the mechanical arm 400 with a UAV pad 600 and UAV 200 during the UAV take-off, according to one or more embodiments.

After initialization for take-off when the UAV is ready for flight, the UAV pad coupler 610 contracts to release, or decouple, the UAV 200 to transition to flight. The UAV 200 takes off from the UAV pad 600 with a trajectory parallel to a trajectory of the UAV pad 600 and the UAV 200 increases a distance from the UAV pad 600, such as in forward and upper directions, for example.

Figure 11:
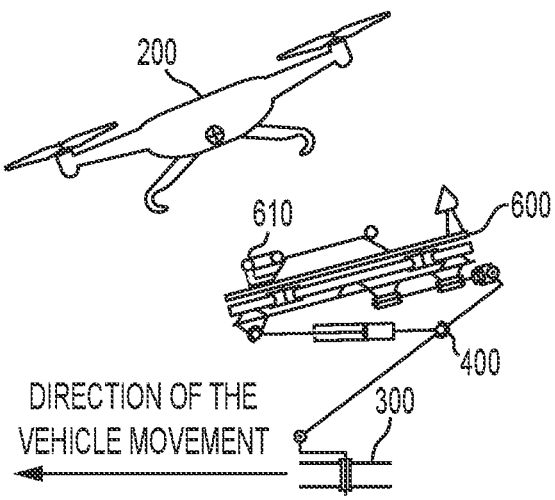
FIG. 11 depicts a configuration of the mechanical arm with a UAV pad and a UAV after the UAV take-off, according to one or more embodiments.

FIG. 11 depicts a configuration of the mechanical arm 400 with a UAV pad 600 and a UAV 200 after the UAV take-off, according to one or more embodiments.

After the UAV take-off, a configuration of the mechanical arm 400 is changed to increase a distance from the UAV 200 in flight as the UAV 200 also continues to increase the distance from the mechanical arm 400 and UAV pad 600 to decrease a probability of a collision of the UAV 200 with the mechanical arm 400 and UAV pad 600.

Figure 12:
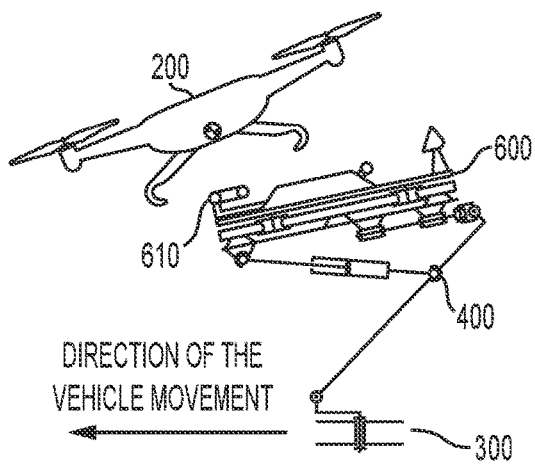
FIG. 12 depicts a configuration of the mechanical arm with a UAV pad and a UAV before the UAV landing, according to one or more embodiments.

FIG. 12 depicts a configuration of the mechanical arm 400 with a UAV pad 600 and a UAV 200 before the UAV landing, according to one or more embodiments.

As shown in FIG. 12, the mechanical arm 400 may move the UAV pad 600 without a loaded UAV 200 into a position and orientation for the UAV landing and/or retrieval. The UAV pad trajectory is parallel to or converging with the UAV trajectory, an orientation of the UAV pad 600 corresponds to the UAV 200 orientation in flight, and a velocity of the UAV pad 600 in a flight direction of the UAV 200 is slightly different, for example, higher, than a UAV velocity in a flight direction of the UAV 200 during the UAV landing. The pitch of the UAV pad 600 is different from, for example, smaller, or lower, or less, than the pitch of the approaching UAV 200. Such an orientation of the UAV pad 600 allows for a controlled non-destructive collision of the UAV 200 with the UAV pad 600. The UAV 200 is flying in a same direction as a direction of the UAV pad movement, but with a different, for example, lower, velocity than a velocity of the UAV pad 600, so that the UAV pad 600 moves to initiate contact with the UAV 200 in flight by a coordinated movement of the mechanical arm 400 with the UAV carrier 300.

In this landing and retrieval operation of the UAV 200 with the UAV pad 600, the UAV 200, UAV carrier 300, and mechanical arm 400 may move in a coordinated manner. For example, the UAV 200 may move in coordination with the UAV carrier 300 so that the UAV 200 is stationary in flight relative to the UAV carrier 300 while the mechanical arm 400 moves the UAV pad 600 relative to the UAV 200 and the UAV carrier 300 to contact the UAV 200. Additionally or alternatively, the UAV 200 may move in coordination with the UAV carrier 300 so that the UAV carrier 300 approaches the UAV 200 while the mechanical arm 400 remains in a stationary landing position relative to the UAV carrier 300 so that the UAV pad 600 on the mechanical arm 400 moves relative to the UAV 200 via the UAV carrier 300 to contact the UAV 200. Additionally or alternatively, the UAV 200 may move in coordination with the UAV carrier 300 so that the UAV 200 approaches the UAV carrier 300 while the mechanical arm 400 remains in a stationary landing position relative to the UAV carrier 300 so that the UAV 200 moves relative to the UAV pad 600 on the mechanical arm 400 to contact the UAV pad 600. Additionally or alternatively, the UAV 200, UAV carrier 300, and mechanical arm 400 may simultaneously move so that the UAV 200 approaches the UAV carrier 300 while the UAV carrier 300 approaches the UAV 200 and while the mechanical arm 400 moves relative to the UAV 200 and the UAV carrier 300 so that the UAV 200 and the UAV pad 600 contact each other.

Figures 13A, 13B, 13C:
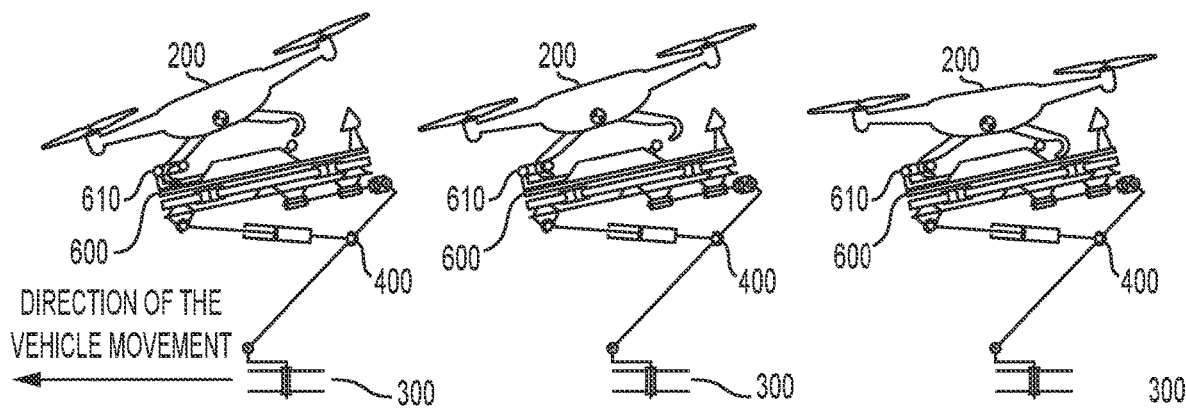
FIGS. 13A, 13B, and 13C depict a configuration of the mechanical arm with a UAV pad and a UAV during the UAV landing, and illustrating an initial landing position in FIG. 13A, a middle landing position in FIG. 13B, and a final landing position in FIG. 13C, according to one or more embodiments.

FIGS. 13A, 13B, and 13C depicts a configuration of the mechanical arm 400 with a UAV pad 600 and a UAV 200 during the UAV landing, and illustrating an initial landing position (FIG. 13A), a middle landing position (FIG. 13B), and a final landing position (FIG. 13C), according to one or more embodiments.

As shown in FIGS. 13A, 13B, and 13C, the approaching UAV 200 makes initial contact with, and/or is contacted by the expanded front part of the UAV pad coupler 610. A shape of the UAV landing gear is designed to correspond to a shape of the front part of the UAV pad coupler 610 so that a lateral movement of the UAV 200 on the UAV pad 600 secures a portion of the UAV 200 on the UAV pad 600. For example, as illustrated in FIGS. 13A, 13B, and 13C, the front landing gear of the UAV 200 is formed in a front concave shape to correspond to a front rod shape of the UAV pad 600, and the UAV 200 contacts or is contacted by the UAV pad 600 so that the front rod shape is inserted into the front concave shape as the UAV 200 moves backward on the UAV pad 600 relative to the direction of UAV carrier 300 movement. The UAV 200 may be moved to a stable position on the UAV pad 600 due to aerodynamic drag pushing the UAV 200 backward on the UAV pad 600. The UAV 200 changes, for example, decreases, thrust and changes, for example, decreases, lift to transition from flight and to avoid unwanted detachment from the UAV pad 600.

Figure 14:
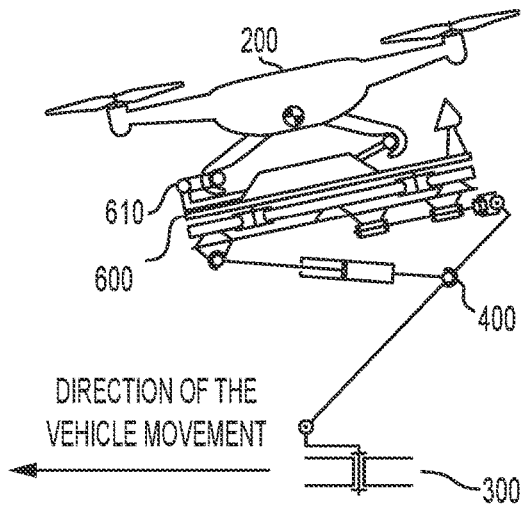
FIG. 14 depicts a configuration of the mechanical arm with a UAV pad and a UAV after the UAV landing, according to one or more embodiments.

FIG. 14 depicts a configuration of the mechanical arm 400 with a UAV pad 600 and a UAV 200 after the UAV landing, according to one or more embodiments.

As shown in FIG. 14, after the UAV 200 moves to a stable position on the UAV pad 600, the UAV pad coupler 610 extends to secure the UAV 200 on the UAV pad 600. For example, the UAV pad coupler 610 may include a rear rod shape that extends into a rear concave shape of a rear landing gear of the UAV 200, so that the UAV 200 is secured on the UAV pad 600 in forward, backward, upward, and downward directions.

The above-described operations of the UAV take-off and the UAV landing and/or retrieval can be performed within limits of minimum and maximum velocity and performance of the UAV carrier 300 and maximum velocity and performance of the UAV 200 taking into account the environmental conditions existing during the operations. For example, if a maximum speed of the UAV carrier 300 is 180 km/h on a road, a cross wind is blowing at 30 km/h in a direction perpendicular to the direction of travel of the UAV carrier 300, and a maximum airspeed of the UAV 200 is 80 km/h, the UAV take-off or landing or retrieval cannot be performed while the speed of the UAV carrier 300 is higher than 74 km/h.

Figure 15:
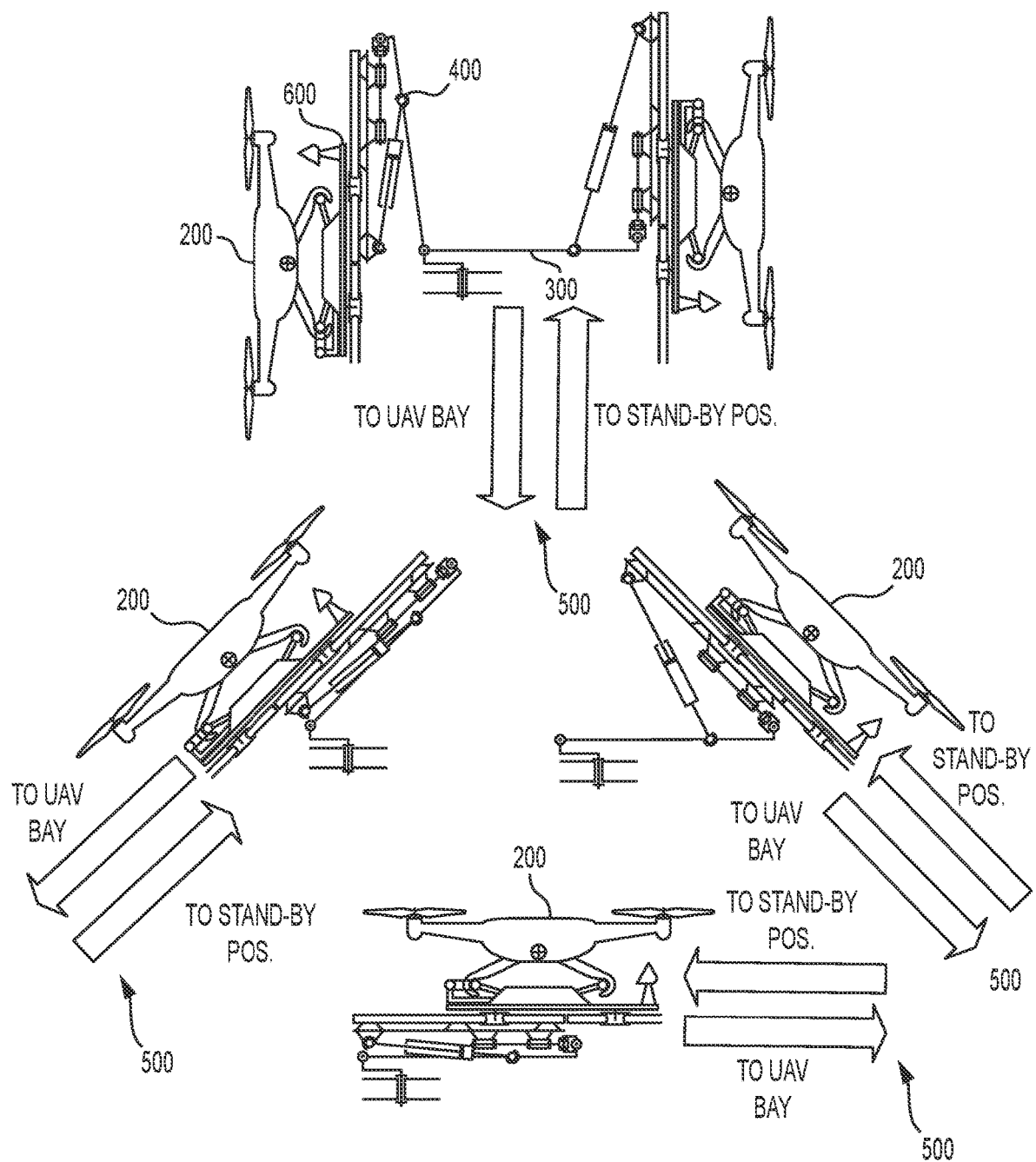
FIG. 15 depicts various configurations of the mechanical arm with a UAV pad and a UAV for transportation of the UAV pad and UAV into and out of a UAV bay, according to one or more embodiments.

FIG. 15 depicts various configurations of the mechanical arm 400 with a UAV pad 600 and a UAV 200 for transportation of the UAV pad 600 and UAV 200 into and out of a UAV bay 500, according to one or more embodiments.

As shown in FIG. 15, the mechanical arm 400 may move the UAV pad 600 into a horizontal, vertical, and/or angled position for transportation of the UAV pad 600 and UAV 200 into and out of a UAV bay 500. The mechanical arm 400 may remain in the standby position while the UAV pad 600 and UAV 200 is transported into and out of a UAV bay 500, or may move to a load/unload position for transportation of the UAV pad 600 and UAV 200 into and out of a UAV bay 500.

Figure 16:
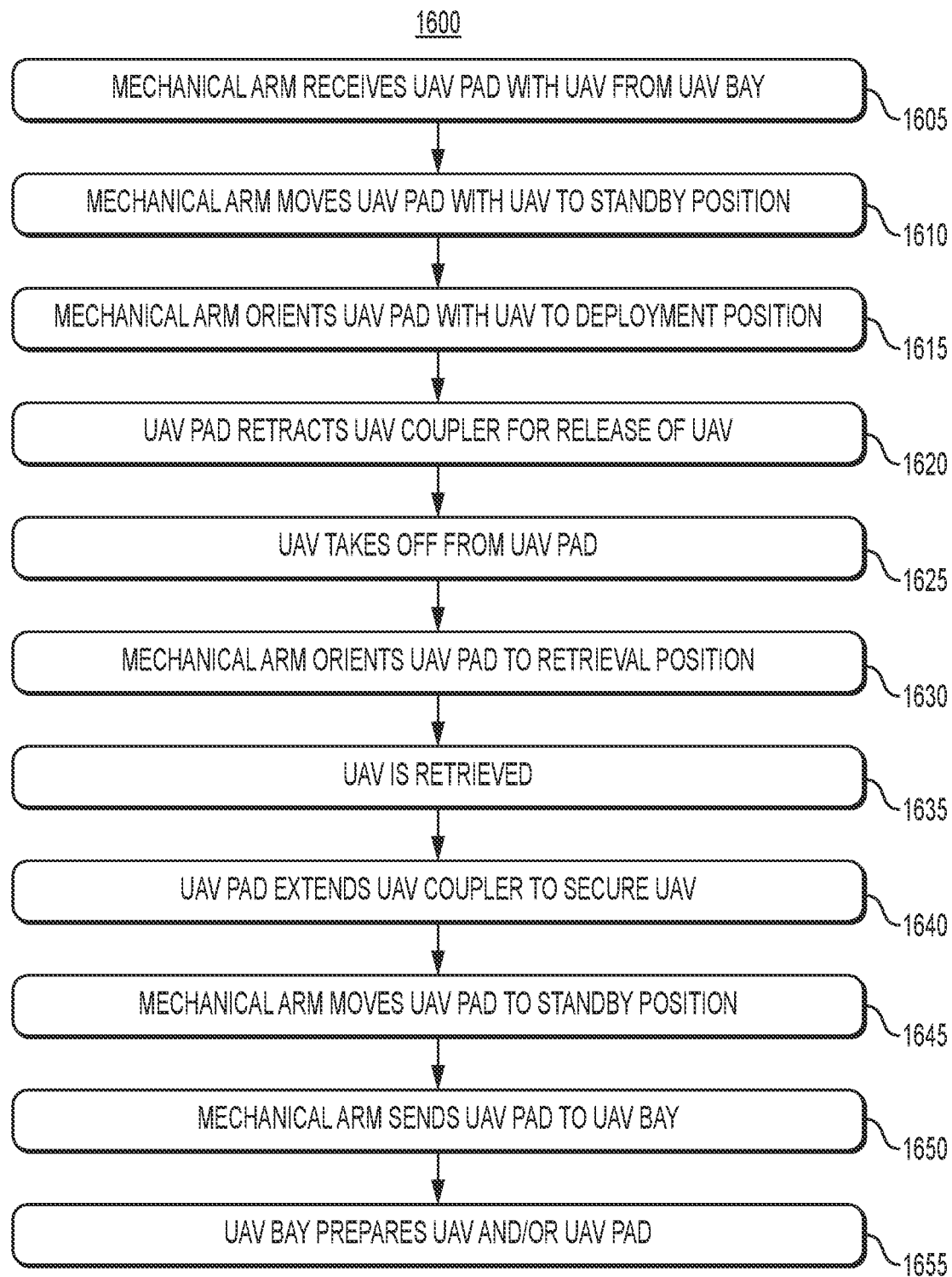
FIG. 16 depicts a flowchart of a method for operation of a UAV launch and retrieval system, according to one or more embodiments.

FIG. 16 depicts a flowchart of a method 1600 for operation of a UAV launch and retrieval system 100, according to one or more embodiments.

As shown in FIG. 16, a method 1600 for operation of a UAV launch and retrieval system 100 may include the mechanical arm 400 receiving, or retrieving, a UAV pad 600 with a UAV 200 secured by UAV pad coupler 610 from the UAV bay 500 (operation 1605) as discussed with regard to FIG. 15, for example. The mechanical arm 400 may move the UAV pad 600 with the UAV 200 to a standby position (operation 1610). The mechanical arm 400 may move the UAV pad 600 with the UAV 200 to a deployment position based on a deployment flight path of the UAV 200 from the UAV pad 600 (operation 1615) as discussed with regard to FIG. 9, for example. The UAV 200 may generate an initial thrust and lift based on the flight path of the UAV 200 from the UAV pad 600, and the UAV pad coupler 610 may be retracted to decouple the UAV 200 from the UAV pad 600 (operation 1620) as discussed with regard to FIG. 10, for example. The UAV 200 may take-off from the UAV pad 600 (operation 1625) as discussed with regard to FIG. 11, for example.

Depending on a time of flight of the UAV, the mechanical arm 400 may return to the standby position, or may move to a retrieval position (operation 1630) based on a retrieval flight path of the UAV 200 as discussed with regard to FIG. 12, for example. The UAV 200 may land on, or be retrieved by, the UAV pad 600 on the mechanical arm 400 (operation 1635) as discussed with regard to FIGS. 13A, 13B, and 13C, for example, and the UAV pad coupler 610 may extend to secure the UAV 200 on the UAV pad 600 (operation 1640) as discussed with regard to FIG. 14, for example. The mechanical arm 400 may return with the UAV pad 600 with the UAV 200 to the standby position (operation 1645), or may move directly to send the UAV pad 600 with the UAV 200 to the UAV bay 500 (operation 1650) as discussed with regard to FIG. 15, for example. The UAV bay 500 may prepare the UAV 200 and/or UAV pad 600 for a subsequent deployment, such as by recharging, refueling, and/or re-equipping the UAV 200, for example (operation 1655).

The above operations may be controlled by respective control subsystems of the UAV launch and retrieval system 100 as discussed with regard to FIG. 2, for example.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A system for deploying and retrieving an unmanned aerial vehicle (UAV), the system comprising:
   a UAV pad including a UAV pad base and a UAV pad coupler to couple the UAV to the UAV pad base;
   a mechanical arm including a first end configured to couple to a UAV carrier, and a second end configured to couple to the UAV pad; and
   a controller configured to
      determine a deployment position for the UAV pad so that an orientation of the UAV pad in the deployment position is based on an orientation of the UAV in a deployment flight path of the UAV from the UAV carrier,
      determine a retrieval position for the UAV pad so that an orientation of the UAV pad in the retrieval position is based on an orientation of the UAV in a retrieval flight path of the UAV and so that a pitch of the UAV pad in the retrieval position is different than a pitch of the UAV in flight,
      control the UAV pad, and
      control the mechanical arm to
         receive the UAV pad from a UAV bay in the UAV carrier so that the UAV pad is coupled to the second end of the mechanical arm,
         move the UAV pad to a standby position on the UAV carrier,
         orient the UAV pad to the deployment position for the deployment flight path of the UAV from the UAV carrier, and
         orient the UAV pad to the retrieval position for the retrieval flight path of the UAV.

2. The system of claim 1, wherein the controller is further configured to:
   coordinate a movement of the UAV carrier, the mechanical arm, and the UAV to transition the UAV from being in flight to being on the UAV pad.

3. The system of claim 1, wherein the controller is further configured to:
   control a movement of the UAV carrier in coordination with the UAV so that the UAV is stationary in flight relative to the UAV carrier in motion, and
   while the UAV is stationary in flight relative to the UAV carrier, control the mechanical arm to move the UAV pad relative to the UAV and the UAV carrier to retrieve the UAV in flight at the retrieval position.

4. The system of claim 1, wherein the controller is further configured to:
   control the mechanical arm to move the UAV pad relative to the UAV carrier to the retrieval position, and
   while the mechanical arm remains stationary in the retrieval position, control a movement of the UAV carrier in coordination with the UAV so that the UAV carrier and UAV pad approach the UAV in flight to retrieve the UAV in flight.

5. The system of claim 1, wherein the controller is further configured to:

take over control of a movement of the UAV in flight when the UAV is within a zone of control around the UAV carrier, and hand off control of the movement of the UAV in flight when the UAV is outside the zone of control around the UAV carrier.

6. The system of claim 1, wherein the controller is further configured to:

control the UAV pad coupler to release the UAV when the UAV pad is in the deployment position and the UAV is ready for flight, and control the UAV pad coupler to secure the UAV when the UAV pad is in the retrieval position and the UAV is on the UAV pad.

7. The system of claim 1, wherein the controller is further configured to:

control the mechanical arm after take-off of the UAV to increase a distance from the UAV in flight as the UAV also continues to increase a distance from the mechanical arm and UAV pad to decrease a probability of a collision of the UAV with the mechanical arm and UAV pad.

8. The system of claim 1, wherein the UAV pad includes at least one UAV pad wheel configured to move the UAV pad on the UAV carrier, and wherein the controller is further configured to control the at least one UAV pad wheel of the UAV pad to move the UAV pad to and from the standby position on the UAV carrier to and from the UAV bay in the UAV carrier.

9. The system of claim 8, further comprising at least one rail extending from the UAV bay and configured to receive the at least one UAV pad wheel.

10. A method for deploying and retrieving an unmanned aerial vehicle (UAV) with a UAV carrier including a UAV bay, a UAV pad including a UAV pad base and a UAV pad coupler to couple the UAV to the UAV pad base, a mechanical arm to move the UAV pad, and including a first end configured to couple to the UAV carrier, and a second end configured to couple to the UAV pad, and a controller, the method comprising performing, by the controller, operations including:

determining a deployment position for the UAV pad so that an orientation of the UAV pad in the deployment position is based on an orientation of the UAV in a deployment flight path of the UAV from the UAV carrier, determining a retrieval position for the UAV pad so that an orientation of the UAV pad in the retrieval position is based on an orientation of the UAV in a retrieval flight path of the UAV and so that a pitch of the UAV pad in the retrieval position is different than a pitch of the UAV in flight, controlling the UAV pad, and controlling the mechanical arm to receive the UAV pad from the UAV bay in the UAV carrier so that the UAV pad is coupled to the second end of the mechanical arm, move the UAV pad to a standby position on the UAV carrier, orient the UAV pad to the deployment position for the deployment flight path of the UAV from the UAV carrier, and orient the UAV pad to the retrieval position for the retrieval flight path of the UAV.

11. The method of claim 10, wherein the operations further include:

coordinating a movement of the UAV carrier, the mechanical arm, and the UAV to transition the UAV from being in flight to being on the UAV pad.

12. The method of claim 10, wherein the operations further include:

controlling a movement of the UAV carrier in coordination with the UAV so that the UAV is stationary in flight relative to the UAV carrier in motion, and while the UAV is stationary in flight relative to the UAV carrier, controlling the mechanical arm to move the UAV pad relative to the UAV and the UAV carrier to retrieve the UAV in flight at the retrieval position.

13. The method of claim 10, wherein the operations further include:

controlling the mechanical arm to move the UAV pad relative to the UAV carrier to the retrieval position, and while the mechanical arm remains stationary in the retrieval position, controlling a movement of the UAV carrier in coordination with the UAV so that the UAV carrier and UAV pad approach the UAV in flight to retrieve the UAV in flight.

14. The method of claim 10, wherein the operations further include:

taking over control of a movement of the UAV in flight when the UAV is within a zone of control around the UAV carrier, and handing off control of the movement of the UAV in flight when the UAV is outside the zone of control around the UAV carrier.

15. The method of claim 10, wherein the operations further include:

controlling the UAV pad coupler to release the UAV when the UAV pad is in the deployment position and the UAV is ready for flight, and controlling the UAV pad coupler to secure the UAV when the UAV pad is in the retrieval position and the UAV is on the UAV pad.

16. The method of claim 10, wherein the operations further include:

controlling the mechanical arm after take-off of the UAV to increase a distance from the UAV in flight as the UAV also continues to increase a distance from the mechanical arm and UAV pad to decrease a probability of a collision of the UAV with the mechanical arm and UAV pad.

17. The method of claim 10, wherein the operations further include:

controlling at least one UAV pad wheel of the UAV pad to move the UAV pad to and from the standby position on the UAV carrier to and from the UAV bay in the UAV carrier.

18. A non-transitory computer-readable medium storing instructions, that when executed by at least one processor, perform a method for deploying and retrieving an unmanned aerial vehicle (UAV) with a UAV carrier including a UAV bay, a UAV pad including a UAV pad base and a UAV pad coupler to couple the UAV to the UAV pad base, a mechanical arm to move the UAV pad, and including a first end configured to couple to the UAV carrier, and a second end configured to couple to the UAV pad, the method comprising:

determining a deployment position for the UAV pad so that an orientation of the UAV pad in the deployment position is based on an orientation of the UAV in a deployment flight path of the UAV from the UAV carrier, determining a retrieval position for the UAV pad so that an orientation of the UAV pad in the retrieval position is based on an orientation of the UAV in a retrieval flight path of the UAV and so that a pitch of the UAV pad in the retrieval position is different than a pitch of the UAV in flight, controlling the UAV pad, and controlling the mechanical arm to receive the UAV pad from the UAV bay in the UAV carrier so that the UAV pad is coupled to the second end of the mechanical arm, move the UAV pad to a standby position on the UAV carrier, orient the UAV pad to the deployment position for the deployment flight path of the UAV from the UAV carrier, and orient the UAV pad to the retrieval position for the retrieval flight path of the UAV.

* * * * *